US011726953B2

(12) United States Patent
Dixith et al.

(10) Patent No.: US 11,726,953 B2
(45) Date of Patent: Aug. 15, 2023

(54) SYNCHRONIZING STORAGE POLICIES OF OBJECTS MIGRATED TO CLOUD STORAGE

(71) Applicant: International Business Machines Corporation, Armonk, NY (US)

(72) Inventors: Dileep Dixith, Hyderabad (IN); Chhavi Agarwal, Bengaluru (IN); Anbazhagan Mani, Bangalore (IN); Abhishek Jain, Baraut (IN)

(73) Assignee: International Business Machines Corporation, Armonk, NY (US)

(*) Notice: Subject to any disclaimer, the term of this patent is extended or adjusted under 35 U.S.C. 154(b) by 12 days.

(21) Appl. No.: 16/930,135

(22) Filed: Jul. 15, 2020

(65) Prior Publication Data

US 2022/0019553 A1 Jan. 20, 2022

(51) Int. Cl.
*G06F 16/11* (2019.01)
*G06F 16/182* (2019.01)
(Continued)

(52) U.S. Cl.
CPC .......... *G06F 16/119* (2019.01); *G06F 16/164* (2019.01); *G06F 16/178* (2019.01); *G06F 16/1824* (2019.01)

(58) Field of Classification Search
CPC .. G06F 16/119; G06F 16/1824; G06F 16/178; G06F 16/164
See application file for complete search history.

(56) References Cited

U.S. PATENT DOCUMENTS 9,355,060 B1 5/2016 Barber
9,830,091 B2 11/2017 Venkatesan
(Continued)

FOREIGN PATENT DOCUMENTS

CN 103458003 A * 12/2013
CN 104954465 A * 9/2015 ............ H04L 63/10
(Continued)

OTHER PUBLICATIONS

"Access your Amazon Glacier data in minutes with new retrieval options", Amazon Web Services, Inc., 3 pps., Posted On: Nov. 21, 2016, <https://aws.amazon.com/about-aws/whats-new/2016/11/access-your-amazon-glacier-data-in-minutes-with-new-retrieval-options/>.

(Continued)

*Primary Examiner* — Hosain T Alam
*Assistant Examiner* — Anthony G Gemignani
(74) *Attorney, Agent, or Firm* — Aaron Pontikos

(57) ABSTRACT

One or more computer processors to receive an object to store in a cloud storage environment, wherein the cloud storage environment includes a default storage policy. The one or more processors determine whether the object includes a foreign policy as an attribute of metadata associated with the object. The one or more processors, responsive to determining the object includes the foreign policy as an attribute of the metadata associated with the object, determine whether the foreign policy includes storage rules that differ from the default storage policy of the cloud storage environment, and the one or more processors, responsive to determining the storage rules included in the foreign policy of the metadata of the object differ from the default storage policy of the cloud storage environment, store the object based on the storage rules of the foreign policy, and ignore the default storage policy of the cloud storage environment.

20 Claims, 7 Drawing Sheets

(51) Int. Cl.
*G06F 16/16* (2019.01)
*G06F 16/178* (2019.01)

(56) References Cited

U.S. PATENT DOCUMENTS

| | | | |
|---|---|---|---|
| 10,592,154 B1* | 3/2020 | LeCrone | ............... G06F 3/0604 |
| 2011/0208695 A1 | 8/2011 | Anand | |
| 2017/0093913 A1* | 3/2017 | Summers | ................ H04L 67/10 |
| 2019/0306010 A1 | 10/2019 | Medam | |

FOREIGN PATENT DOCUMENTS

| | | | |
|---|---|---|---|
| JP | 2016206952 A | * | 12/2016 |
| WO | 2016025321 A1 | | 2/2016 |

OTHER PUBLICATIONS

"Information lifecycle management", Wikipedia, 5 pps., page was last edited on Jan. 23, 2020, <https://en.wikipedia.org/wiki/Information_lifecycle_management>.

"Method and System for Structured to Unstructured Data Store Tiering in a Cloud Environment", IP.com No. IPCOM000260114D, IP.com Electronic Publication Date: Oct. 23, 2019, 3 pps., <https://priorart.ip.com/IPCOM/000260114>.

"Restoring Data from Archive Cloud Storage Using a Workflow", Mar. 26, 2020, 2 pps., Commvault, V11 Service Pack 18, <https://documentation.commvault.com/commvault/v11/article?p=9218.htm>.

"Transparent Cloud Tiering", IBM, 2 pps., downloaded fom the Internet on Apr. 21, 2020, <https://www.ibm.com/support/knowledgecenter/STXKQY_5.0.4/com.IBM.spectrum.scale.v5r04.doc/bllins_how_gateway_works.htm>.

"What are Cloud Policies?", CloudHealth by vmware, Jul. 20, 2018, 4 pps., <https://www.cloudhealthtech.com/blog/what-are-cloud-policies>.

Mell et al., "The NIST Definition of Cloud Computing", National Institute of Standards and Technology, U.S. Department of Commerce, NIST Special Publication 800-145, Sep. 2011, 7 pages.

\* cited by examiner

SYNCHRONIZING STORAGE POLICIES OF OBJECTS MIGRATED TO CLOUD STORAGE

FIELD OF THE INVENTION

The present invention relates generally to the field of cloud storage migration, and more particularly to synchronizing local storage policies with cloud environment storage policies.

BACKGROUND OF THE INVENTION

Data processing and storage is a core element of cloud computing environments and security and high availability of stored data and content is an assumed characteristic of cloud storage environments. Hybrid cloud storage is an approach to managing cloud storage that utilizes both local on-premises and off-site resources for data, file, and object storage. To manage the storage of data, files, and objects, a set of information lifecycle management (ILM) rules are created and organized into an ILM policy. An ILM Policy contains overarching storage and management processes, which are often dictated by business goals and legal requirements. An ILM policy includes rules for migration of data, file, and object storage to the cloud storage, and recall from cloud storage.

Cloud storage policies are the operational guidelines under which cloud services operate and are often implemented to ensure the integrity, privacy, and security of company-owned information. Cloud storage environments provide advantageous options that include low cost, high performance, and quick delivery of services. Cloud storage environments include storage policies designed to manage and deliver the advantages of cloud storage to clients.

SUMMARY

Embodiments of the present invention disclose a method, computer program product, and system. The embodiments include a method for synchronizing the storage of an object migrated to a cloud environment with an on-premises storage policy. The method provides for one or more computer processors to receive an object to store in a cloud storage environment, wherein the cloud storage environment includes a default storage policy. The one or more processors determine whether the object includes a foreign policy as an attribute of metadata associated with the object. The one or more processors, responsive to determining the object includes the foreign policy as an attribute of the metadata associated with the object, determine whether the foreign policy includes storage rules that differ from the default storage policy of the cloud storage environment, and the one or more processors, responsive to determining the storage rules included in the foreign policy of the metadata of the object differ from the default storage policy of the cloud storage environment, store the object based on the storage rules of the foreign policy, and ignore the default storage policy of the cloud storage environment.

DETAILED DESCRIPTION

Figure 1:
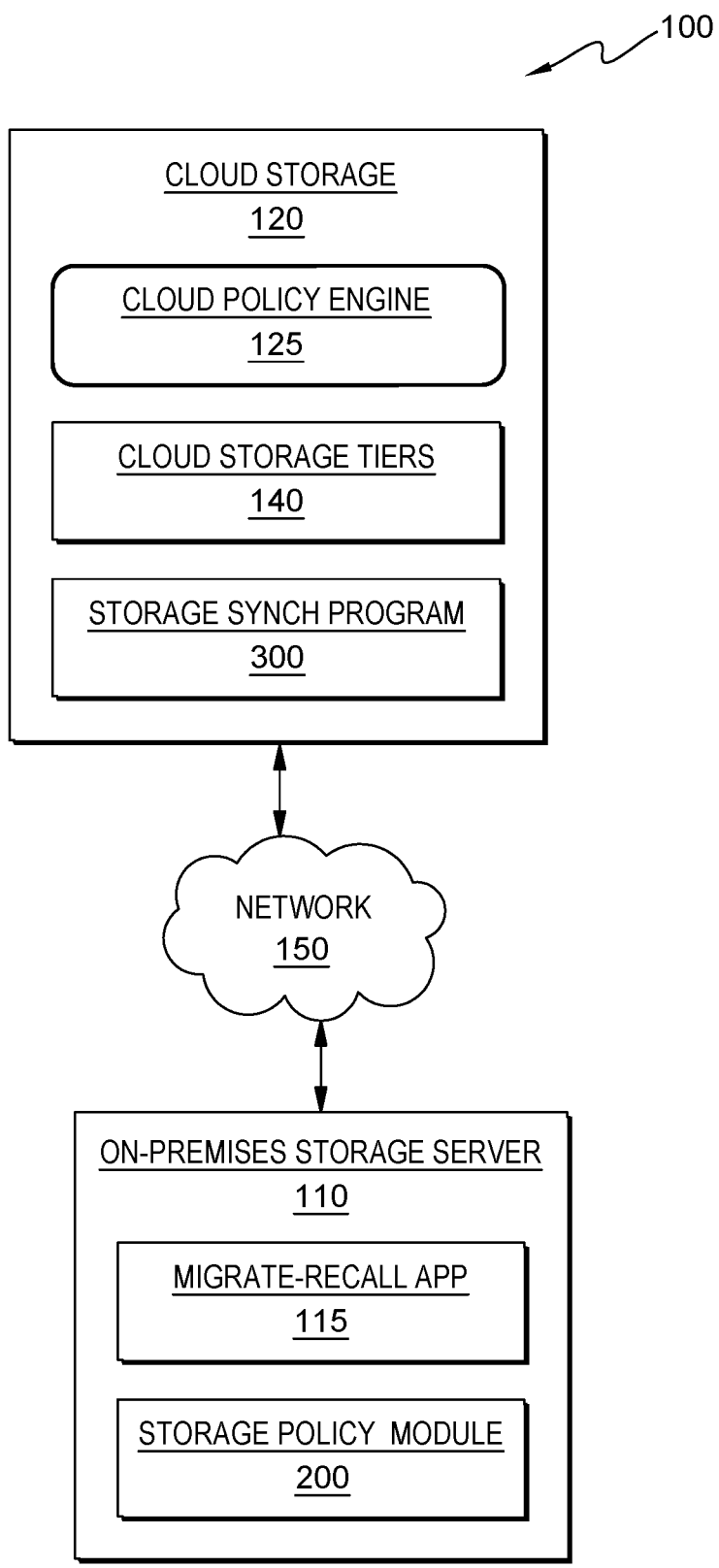
FIG. 1 is a functional block diagram illustrating a distributed data processing environment, in accordance with an embodiment of the present invention.

Embodiments of the present invention recognize that operation of an on-premises storage management application follows a defined set of information lifetime management (ILM) rules organized as a policy. However, subsequent to migrating stored content from on-premises storage locations to cloud storage, the on-premises storage management application no longer has control over the guiding policies and storage activity of the content migrated to a cloud storage environment. Embodiments recognize that on-premises ILM policies and cloud storage policies may not align and may be in conflict. Recall of content stored in the cloud storage environment, and located in low-activity storage locations consistent with a cloud storage policy, may conflict with on-premises ILM policies for the content and result in unexpected recall delays, unanticipated behavior, and possible hanging of the storage management application while waiting for recall confirmation.

Embodiments recognize that storage items may include data, files, documents, and unstructured content referred to as objects. Objects can include content such as music, audio recordings, images, videos, backups, and log files. Data storage is often performed in blocks of memory, files and documents are often stored in a file system architecture or hierarchy storage, and object storage manages content data as an object. For purposes of clarity and simplicity, the term "object" will collectively refer to items to be stored and the storage of items referred to as "object storage".

Hybrid cloud storage capability uses cloud object storage resources, which may include public, private, or on-premises storage resources. Tiering is a storage management technique of hybrid cloud storage that stores objects on a resource based on the frequency of usage of the object. Migration to store objects in cloud storage environments, and recall of stored objects from cloud storage often is done with transparent operations that operate in the background and some instances do not require initiating instruction. Embodiments recognize that frequently accessed objects are stored in on-premises storage, whereas infrequently accessed objects are stored in cloud storage. Cloud storage may include tiers of storage options including a default storage tier, a reduced redundancy tier, and a low-activity tier, sometimes referred to as "glacier" tier of object storage.

Rarely accessed "cold" objects may be stored in low-activity cloud storage, which may require extensive time for access recall.

Embodiments of the present invention provide a method, computer program product, and computer system for synchronizing storage policies between on-premises storage and cloud environment storage of a hybrid cloud solution. Embodiments create a metadata tag associated with the object indicating a pre-set storage policy that governs the storage of the object. The tag identifies a governing storage policy that is considered "foreign" as compared to the cloud storage policies. Embodiments of the present invention recognize that any labeling of a metadata tag can be used to distinguish the on-premises storage policy from the cloud storage policy. Embodiments include the rules of the on-premises storage policy as an attribute of the metadata tag associated with the object.

When the object is migrated to a cloud storage environment, embodiments of the present invention detect the metadata tag indicating an on-premises policy for storage of the object and compare the rules of the policy in the attribute of the metadata to the default cloud storage policy. In response to detecting the rules of the on-premises storage policy associated with the object are different from the default cloud storage policy, a cloud policy engine overrides the default cloud storage policy and generates a customized cloud storage policy synchronized with the on-premises policy, enabling consistent storage management. The generation of customized cloud storage policies with on-premises storage policies enables the build of an automatically synchronized portfolio of storage policies.

In some embodiments, if the metadata tag associated with migration of the object to the cloud environment does not indicate an on-premises storage policy, then the cloud policy engine applies the default cloud storage policy to the object. In some embodiments, if the object stored in the cloud storage environment is further migrated to a low-activity tier of cloud storage and is recalled by the on-premises storage management application, then embodiments of the present invention send a notification in reply to the recall request indicating that the on-premises storage application will be notified when the object is available for recall. Accordingly, embodiments of the present invention operate to avoid delaying and hanging of the application during the extensive time required for recalling the object from low-activity or similar storage tiers.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes on-premises storage server 110, cloud storage 120, all interconnected via network 150. Network 150 can be, for example, a local area network (LAN), a wide area network (WAN), such as the Internet, a virtual local area network (VLAN), or any combination that can include wired, wireless, or optical connections. In general, network 150 can be any combination of connections and protocols that will support object migration and recall between on-premises storage server 110 and cloud storage 120, and communication between migrate-recall app 115, storage policy module 200, and storage synch program 300.

On-premises storage server 110 is a client-accessible server providing on-premises storage of objects. On-premises storage server 110 is depicted as including migrate-recall application (app) 115 and storage policy module 200. On-premises storage server 110 is communicatively connected to cloud storage 120 via network 150. In some embodiments, on-premises storage server 110 can be a web server, a blade server, a desktop computer, a laptop computer, a tablet computer, a netbook computer, or any other programmable electronic computing device capable of receiving, sending, and processing data, and communicating with cloud storage 120, within distributed data processing environment 100 via network 150. In another embodiment, on-premises storage server 110 represents a computing system utilizing clustered computers and components (e.g., database server computers, application server computers, etc.) that act as a single pool of seamless resources when accessed within distributed data processing environment 100. On-premises storage server 110 may include internal and external hardware components, as depicted in more detail and described in FIG. 5.

Migrate-recall app 115 is a storage management application operating on on-premises storage server 110. In some embodiments of the present invention, migrate-recall app 115 initiates the migration activity of objects to a cloud storage environment based on a reduced frequency of object access requests, operating in a background operation on on-premises storage server 110. In other embodiments, migrate-recall app 115 may receive a direct request to migrate an object from an on-premises storage location to a cloud storage location. In some embodiments, migrate-recall app 115 initiates a request to recall an object stored in cloud storage tiers 140 to on-premises storage server 110.

Storage policy module 200 is a component of storage synch program 300 operating on on-premises storage server 110. In some embodiments, storage policy module 200 interacts with migrate-recall app 115 initiating activity to migrate on-premises stored objects to a cloud storage environment, such as cloud storage tiers 140. Storage policy module 200 determines whether an on-premises ILM policy exists for an object prior to migration, and in response to determining an on-premises ILM policy exists for the object, storage policy module 200 creates a tag in the metadata associated with the object and includes the on-premises ILM policy rules as an attribute of the metadata. In some embodiments, if storage policy module 200 determines that an object selected to migrate to a cloud storage environment does not include an on-premises ILM policy, then storage policy module 200 does not include on-premises policy rules in an attribute of the metadata associated with the object. In some embodiments, storage policy module 200 does not create a tag indicating a governing on-premises storage policy for the object. In other embodiments, storage policy module 200 creates a tag in the metadata associated with the object that indicates an absence of on-premises storage policy.

Cloud storage 120 is a collection of resources available to support hybrid cloud storage of objects. Cloud storage 120 is depicted as including storage tiers 140, cloud service interface 130, cloud policy engine 125, cloud storage tiers 140, and storage synch program 300. Cloud storage 120 receives objects and created metadata associated with the objects migrated from on-premises storage server 110 by migrate-recall app 115, processed by cloud policy engine 125, and stored in cloud storage tiers 140.

In some embodiments, cloud storage 120 can be a web server, a blade server, a desktop computer, a laptop computer, a tablet computer, a netbook computer, or any other programmable electronic computing device capable of receiving, sending, and processing data, and communicating with on-premises storage server 110, within distributed data processing environment 100 via network 150. In another embodiment, cloud storage 120 represents a computing system utilizing clustered computers and components (e.g., database server computers, application server computers, hardware storage components, etc.) that act as a single pool of seamless resources when accessed within distributed data processing environment 100. Cloud storage 120 may include internal and external hardware components, as depicted in more detail and described in FIG. 5.

Cloud policy engine 125 checks policy rules of the object received as migrated from on-premises storage server 110 and objects stored with cloud storage tiers 140. Cloud policy engine 125 performs activities associated with the storage of objects in cloud storage tiers 140, consistent with policies governing the storage of the object in cloud storage.

Cloud storage tiers 140 includes storage resources of cloud storage 120. Cloud storage tiers 140 includes default storage capacity for objects having infrequent access activity migrated from on-premises storage server 110. Cloud storage tiers 140 are governed by cloud storage policy rules performed by cloud policy engine 125. Cloud storage tiers 140 includes storage capacity for objects that have had little or no activity within a predetermined period, often referred to as low-activity storage.

Storage synch program 300 operates within the storage environment of cloud storage 120 and in conjunction with storage policy module 200. Storage synch program 300 receives an object from migrate-recall app 115, which is a storage application of on-premises storage server 110, and also receives metadata associated with the migrated object. Storage synch program 300 accesses the metadata of the migrated object and determines whether the object includes a pre-set storage policy of the on-premises storage, which is included as an on-premises storage tag in the metadata associated with the migrated object. Storage synch program 300 accesses the policy rules from an attribute of the metadata and determines whether the policy rules of the object differ from the cloud storage policy. In response to the on-premises policy rules differing from the cloud storage policy rules, storage synch program 300 creates a customized cloud policy associated with the object and applies the policy to storage activities of the object within the cloud storage environment.

In some embodiments, if the object migrated to cloud storage does not include a pre-set on-premises policy tag in the object metadata, then storage synch program 300 applies the default cloud storage policy to the object, and records a storage location tag in the object metadata indicating default storage location. For the case in which the attribute rules of the metadata associated with the object migrating to cloud storage are consistent with the cloud storage policy, storage synch program 300 will apply the default cloud storage policy to the object and record the storage location in the metadata of the object.

Figure 2:
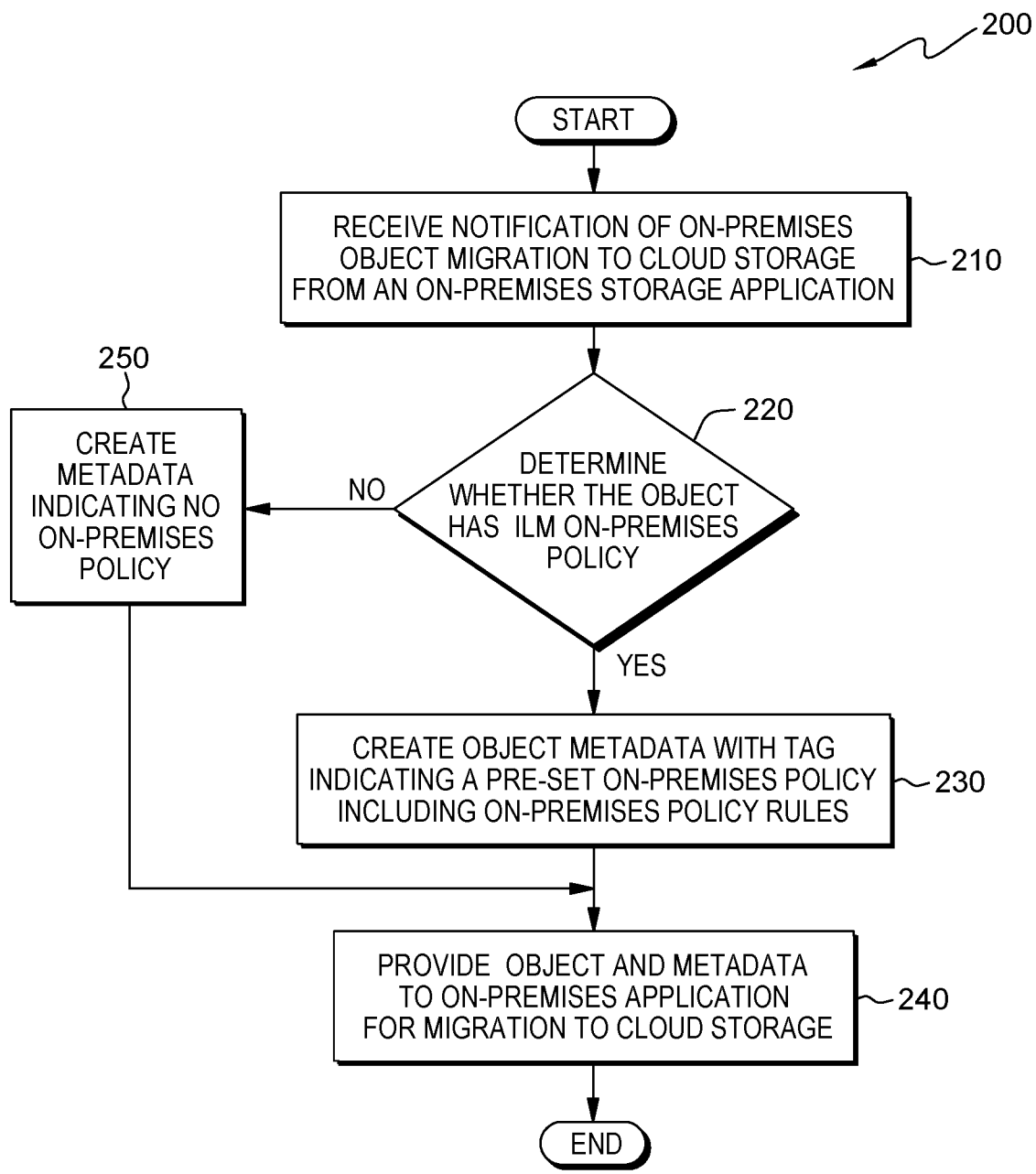
FIG. 2 is a flowchart depicting operational steps of a storage policy module that performs in concert with a storage synch program of FIGS. 3 and 4, operating in the distributed data processing environment of FIG. 1, in accordance with an embodiment of the present invention.
Figure 3:
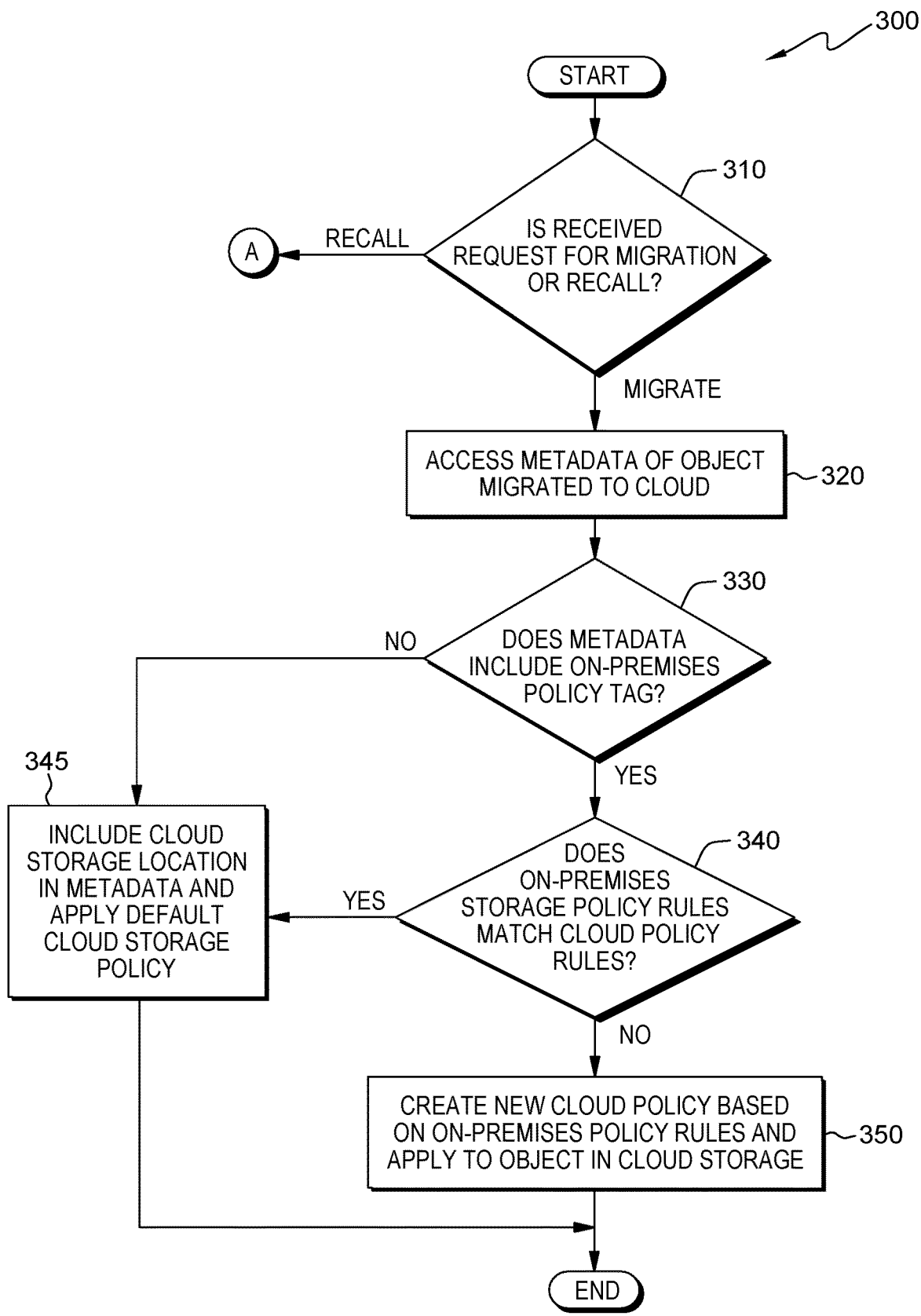
FIG. 3 is a flowchart depicting operational steps of the storage synch program operating in the distributed data processing environment of FIG. 1, in accordance with embodiments of the present invention.
Figure 4:
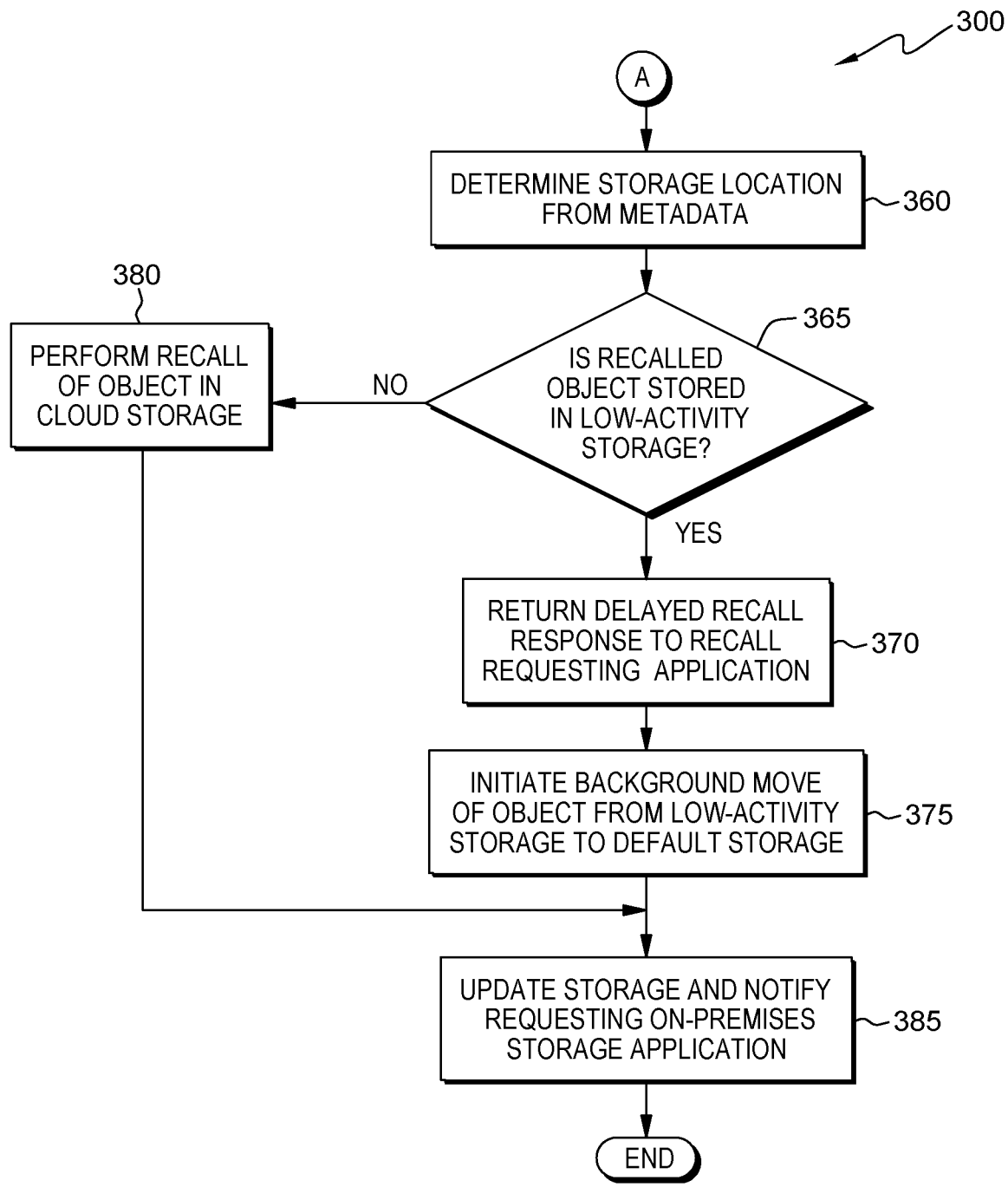
FIG. 4 is a continuation of the flowchart depicting the operational steps of the storage synch program operating in the distributed data processing environment of FIG. 1, in accordance with embodiments of the present invention.

FIG. 2 is a flowchart depicting operational steps of storage policy module 200 that performs in concert with storage synch program 300 of FIGS. 3 and 4, operating in the distributed data processing environment of FIG. 1, in accordance with an embodiment of the present invention.

Storage policy module 200 receives a notification of an on-premises object migration to cloud storage from an on-premises storage application (step 210). Storage policy module 200 receives a notification from migrate-recall app 115 of on-premises storage server 110 indicating that an object is identified to migrate to cloud storage. On-premises stored objects that have not been accessed frequently are often referred to as "cold", and storage management applications, such as migrate-recall app 115 identify cold objects for migration to cloud storage to free on-premises storage and improve response for more frequently accessed objects.

Storage policy module 200 determines whether the object includes an ILM on-premises storage policy (decision step 220). In some embodiments of the present invention, on-premises objects are stored according to an on-premises ILM storage policy governing the storage activity of the object. Policy rules are applied to the object for the duration of on-premises storage. An ILM policy consists of the overarching storage and information policies that drive management processes. Policies are often dictated by business goals and legal requirements and, therefore, policies generally tie into a framework of overall IT governance and management. Storage policy module 200 determines whether the migrating object is governed by an on-premises ILM storage policy.

For the case in which storage policy module 200 determines that the object to migrate to cloud storage does not include an ILM on-premises storage policy (step 220, "NO" branch), storage policy module 200 proceeds to step 250 and creates metadata associated with the object indicating no on-premises storage policy. In some embodiments, the metadata created by storage policy module 200 indicates that the object is not governed by a particular on-premises storage policy, which may include terms or codes indicating the lack of governing on-premises storage policy. In other embodiments, storage policy module 200 does not make an addition to the metadata of the object, and the absence of a metadata tag explicitly indicates that the object is not under a particular on-premises ILM storage policy. Storage policy module 200 proceeds to step 240 to provide the object and metadata to the on-premises application for migration to cloud storage.

For the case in which storage policy module 200 determines that the object to migrate to cloud storage does include an ILM on-premises storage policy (step 220, "YES" branch), storage policy module 200 creates a metadata tag indicating a pre-set on-premises storage policy including on-premises policy rules (step 230). In some embodiments, storage policy module 200 creates a metadata tag indicating the on-premises object storage is managed under an ILM on-premises storage policy. In some embodiments, storage policy module 200 includes the on-premises storage policy rules as an attribute of the metadata of the object. In some embodiments, the metadata tag indicates the ILM on-premises storage policy as a policy that is "foreign" to the cloud storage environment to which the object is being migrated, and the object metadata tag may indicate "foreign storage policy."

Storage policy module 200 provides the object and metadata to the one-premise storage application for migration to the cloud storage (step 240). Storage policy module 200 connects with migrate-recall app 115 and provides the metadata indicating the pre-set on-premises storage policy associated with the object migration to cloud storage. The object and associated metadata are made available to migrate-recall app 115 to perform the object migration to cloud storage, and storage policy module 200 ends.

FIG. 3 is a flowchart depicting operational steps of storage synch program 300 operating in the distributed data processing environment of FIG. 1, in accordance with embodiments of the present invention.

Storage synch program 300 determines whether a received request is for the migration of an object from an on-premises storage application or a request for a recall of an object from cloud storage (decision step 310). Storage synch program 300 receives a request from an on-premises storage application. Embodiments of the present invention include in the received request, identification of whether the request is for migration of an object from on-premises storage to cloud storage or recall of an object present in cloud storage. For example, migrate-recall app 115 operating on on-premises storage server 110 sends a request to cloud storage 120. Storage synch program 300, operating on cloud storage 120, receives the request and determines whether the request is for migration of an object from on-premises storage to cloud storage or recall of an object presently stored in cloud storage.

For the case in which storage synch program 300 determines the received request to be for a recall of an object from cloud storage (step 310, "RECALL" branch), storage synch program 300 proceeds to path "A", which is presented in detail with respect to FIG. 4.

For the case in which storage synch program 300 determines the received request to be for migration of an object from an on-premises storage application (step 310, "MIGRATE" branch), storage synch program 300 accesses the metadata of the object migrated to cloud storage (step 320). The metadata of the object and object are included together in the migration to cloud storage. Embodiments of the present invention include tags and/or attributes associated with the object storage policy of the object within the metadata of the object.

Storage synch program 300 determines whether the metadata includes an indication of an on-premises storage policy (decision step 330). Storage synch program 300 determines whether the metadata associated with the object to be migrated indicates a pre-set on-premises storage policy was applied to the object while in on-premises storage by accessing metadata tags and metadata attributes of the object. The metadata tag may include labels, terms, or codes indicating that the pre-set on-premises storage policy applies to the object, and a metadata attribute includes rules governing the storage of the object. For example, a company's on-premises ILM storage policy has a rule that retains object data in active storage for two years. Storage synch program 300 determines the metadata tag includes an "on-premises storage policy" and the metadata includes an attribute of the policy with rules retaining the object data in active storage for two years.

For the case in which storage synch program 300 determines the metadata of the object does not include an indication of an on-premises storage policy (step 330, "NO" branch), storage synch program 300 includes the cloud storage location in the metadata of the object (typically the default storage tier of cloud storage) and applies the default cloud storage policy to the object storage (step 345). Recording the storage location of the object in cloud storage within the metadata of the object enables more efficient responses to recall requests from on-premises storage applications. In some embodiments, the object migrating to cloud storage may not include a metadata tag related to on-premises storage policy of the object, in which case storage synch program 300 determines that the object does not have an on-premises storage policy and proceeds to step 345 to include in the object metadata the storage location of the object in cloud storage and applies the default cloud storage policy. In some embodiments, if the object does not include associated metadata, then storage synch program 300 generates metadata associated with the object and includes the information regarding the storage location of the object within cloud storage within the metadata.

For the case in which storage synch program 300 determines the metadata of the object does include an indication of a pre-set on-premises storage policy (step 330, "YES" branch), storage synch program 300 determines whether the pre-set on-premises policy rules match the cloud storage default policy rules (decision step 340). The pre-set on-premises storage policy rules may specify a duration of retention and storage requirements for retrieval, such as for audits or legal requirements. Storage synch program 300 compares the rules associated with the pre-set on-premises storage policy of the object, which is included in an attribute of the metadata of the object, and determines whether the pre-set on-premises storage policy rules match the cloud storage default policy rules.

For the case in which storage synch program 300 determines that the pre-set on-premises storage policy rules match the cloud policy rules (step 340, "YES" branch), storage synch program 300 proceeds to step 345 and includes the cloud storage location in the metadata associated with the object and applies the default cloud storage policy to the object.

For the case in which storage synch program 300 determines that the pre-set on-premises storage policy rules do not match the cloud policy rules (step 340, "NO" branch), storage synch program 300 creates a new cloud storage policy based on the on-premises policy rules and applies the new policy to the object stored in cloud storage (step 350). Storage synch program 300 creates a new cloud storage policy based on the pre-set on-premises storage policy rules and applies the new cloud storage policy to the object in cloud storage. In some embodiments, storage synch program 300 adds the newly created cloud storage policy that is based on the pre-set on-premises storage policy of the object to a portfolio of cloud storage policies maintained by cloud policy engine 125.

For example, storage synch program 300 determines that the pre-set on-premises storage policy rules do not match the default cloud storage policy rules, and auto-creates a new cloud policy, based on the on-premises storage policy rules included in an attribute of the object metadata that accompanies the object in migration to cloud storage. Storage synch program 300 associates the new cloud policy to the object in cloud storage, and cloud policy engine 125 performs storage activity on the object data consistent with the new cloud policy instead of the default cloud storage policy.

Having applied a storage policy to the object in cloud storage, storage synch program 300 ends.

FIG. 4 is a continuation of the flowchart depicting the operational steps of the storage synch program 300 (path "A"), operating in the distributed data processing environment of FIG. 1, in accordance with embodiments of the present invention. Returning to step 310 of FIG. 3, in some embodiments of the present invention, storage synch program 300 determines that the request received from the on-premises storage application is for a recall of an object from cloud storage. Storage synch program 300 determines the storage location from the metadata associated with the stored object (FIG. 4, step 360).

Storage synch program 300 determines whether the recalled object is stored in low-activity storage (decision step 365). Low-activity storage within the cloud storage environment is a storage tier for objects that have very low access frequency, and may have a threshold of time since last accessed associated with objects, for example, no access with one year. Low-activity storage offers lower cost storage for retaining objects, but often includes potential delays associated with recall of the object to more readily accessible cloud storage tiers. For example, some cloud storage low-activity tiers may be referred to as "glacial storage," based on an association of the term "cold" with very low access frequency of an object. Objects in low-activity storage tiers may be stored on magnetic tape or other media that require additional actions to enable access and availability for recall.

For the case in which storage synch program 300 determines that the object is not stored in low-activity storage (step 365, "NO" branch), storage synch program 300 initiates a recall activity of the object in cloud storage (step 380). In some embodiments, storage synch program 300 accesses the metadata of the object and determines that the storage location is not in low-activity storage, but in default cloud storage. Storage synch program 300 initiates a recall of the object, connecting with cloud policy engine 125 and identifies the object for recall. Cloud policy engine 125 accesses the object from default cloud storage and provides the recall of the object to the on-premises storage application submitting the recall request.

For the case in which storage synch program 300 determines that the object is stored in low-activity storage (step 365, "YES" branch), storage synch program 300 returns a delayed recall response sent to the recall requesting application when the object is ready for recall (step 370). In some embodiments, storage synch program 300 responds to the recall request indicating a delay in the availability of objects due to storage in a low-activity cloud storage tier. The response enables the requesting on-premises application to proceed with operations, without causing the on-premises application to "hang" while waiting for the delivery of the recalled object, which may not be available for an extended period. The wait time of the on-premises application requesting the recall is avoided, greatly improving the performance of storage management applications.

Storage synch program 300 initiates a background recall of the object from low-activity storage to default storage (step 375). Storage synch program 300 initiates the access move of the object from low-activity storage to default storage by initiating the move with cloud policy engine 125 operating on cloud storage 120. For purposes of simplicity regarding the embodiments of the present invention, herein, cloud storage tiers in which stored objects are readily available for recall are collectively referred to as cloud "default storage." Cloud storage tiers in which recall of objects includes a delay or requires an intervention are collectively referred to as low-activity cloud storage.

Storage synch program 300 updates the storage location of the recalled object and notifies the recall-requesting on-premises storage application (step 385). In response to the completion of the background move of the object stored in low-activity cloud storage, storage synch program 300 updates the storage location of the recalled object to indicate the current storage location as cloud default storage. Storage synch program 300 sends a notification to the on-premises storage application requesting the recall of the object indicating the availability of the object for recall from default storage.

Having completed the recall request, storage synch program 300 ends.

Figure 5:
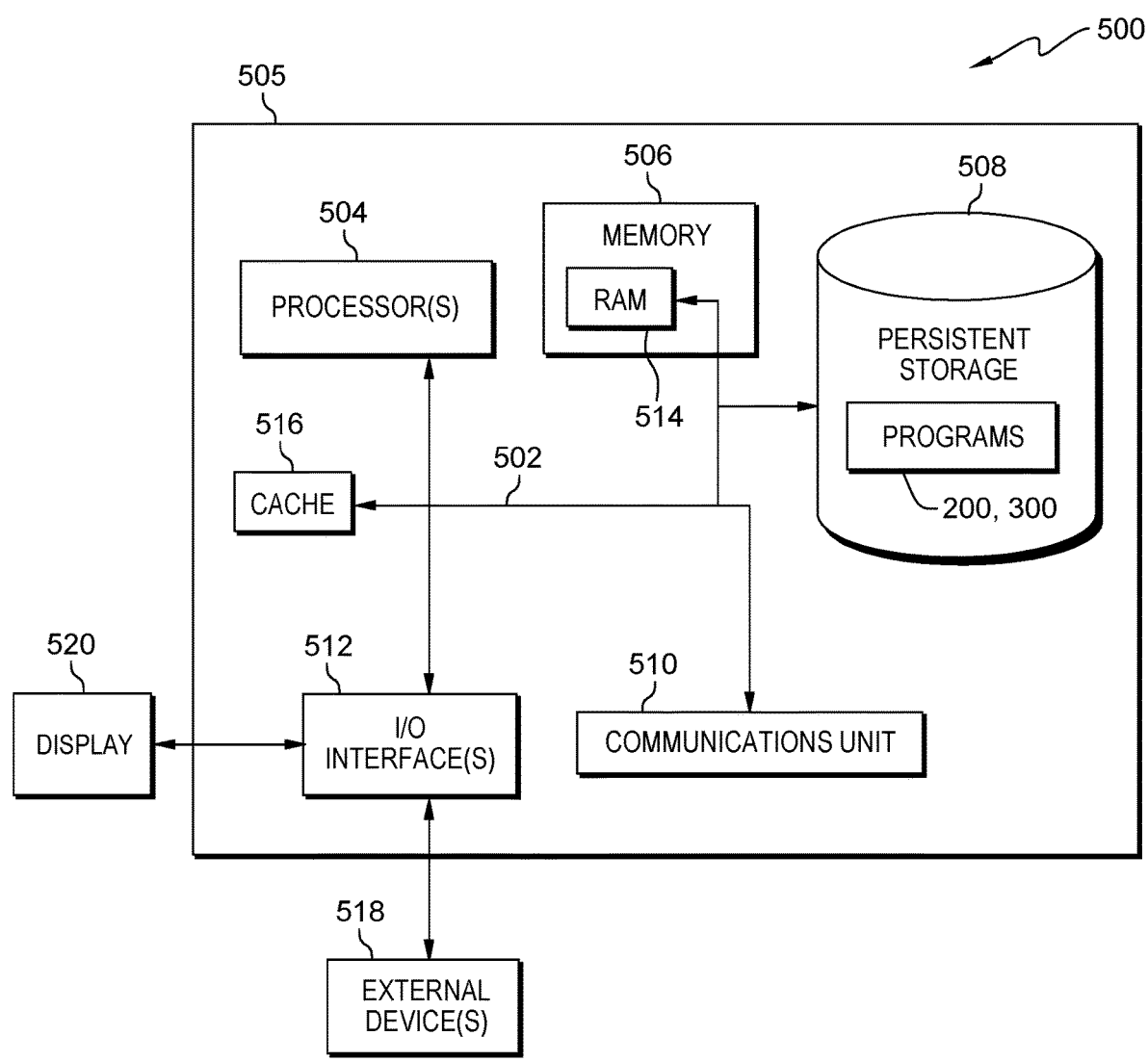
FIG. 5 depicts a block diagram of components of a computing system, including a computing device configured to operationally perform the storage policy module and storage synch program of FIGS. 2, 3, and 4, in accordance with an embodiment of the present invention.

FIG. 5 depicts a block diagram of components of a computing system, including computing device 505, configured to include or operationally connect to components depicted in FIG. 1, and with the capability to operationally perform storage policy module 200 of FIG. 2 and storage synch program 300 of FIG. 3, in accordance with an embodiment of the present invention.

Computing device 505 includes components and functional capability similar to components of on-premises storage server 110 and cloud storage 120, (FIG. 1), in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 505 includes communications fabric 502, which provides communications between computer processor(s) 504, memory 506, persistent storage 508, communications unit 510, an input/output (I/O) interface(s) 512. Communications fabric 502 can be implemented with any architecture designed for passing data and/or control information between processors (such as microprocessors, communications, and network processors, etc.), system memory, peripheral devices, and any other hardware components within a system. For example, communications fabric 502 can be implemented with one or more buses.

Memory 506, cache memory 516, and persistent storage 508 are computer-readable storage media. In this embodiment, memory 506 includes random access memory (RAM) 514. In general, memory 506 can include any suitable volatile or non-volatile computer-readable storage media.

In one embodiment, storage policy module 200 and storage synch program 300 are stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of distributed data processing environment 100. In these examples, communications unit 510 includes one or more network interface cards. Communications unit 510 may provide communications through the use of either or both physical and wireless communications links. Storage policy module 200 and storage synch program 300 may be downloaded to persistent storage 308 through communications unit 510.

I/O interface(s) 512 allows for input and output of data with other devices that may be connected to computing system 500. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., storage policy module 200 and storage synch program 300 can be stored on such portable computer-readable storage media and can be loaded onto persistent storage 508 via I/O interface(s) 512. I/O interface(s) 512 also connects to a display 520.

Display 520 provides a mechanism to display data to a user and may, for example, be a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
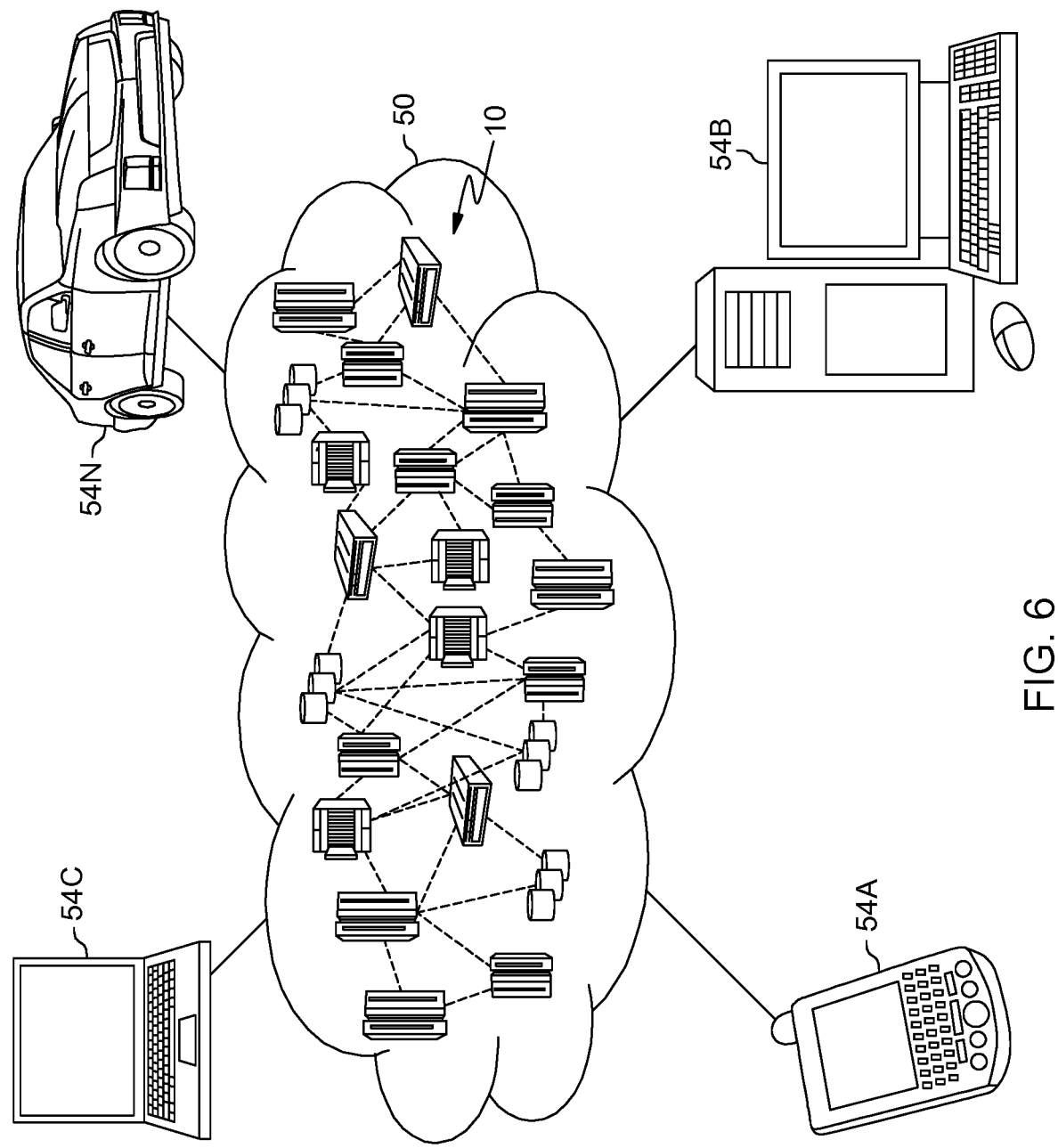
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 7:
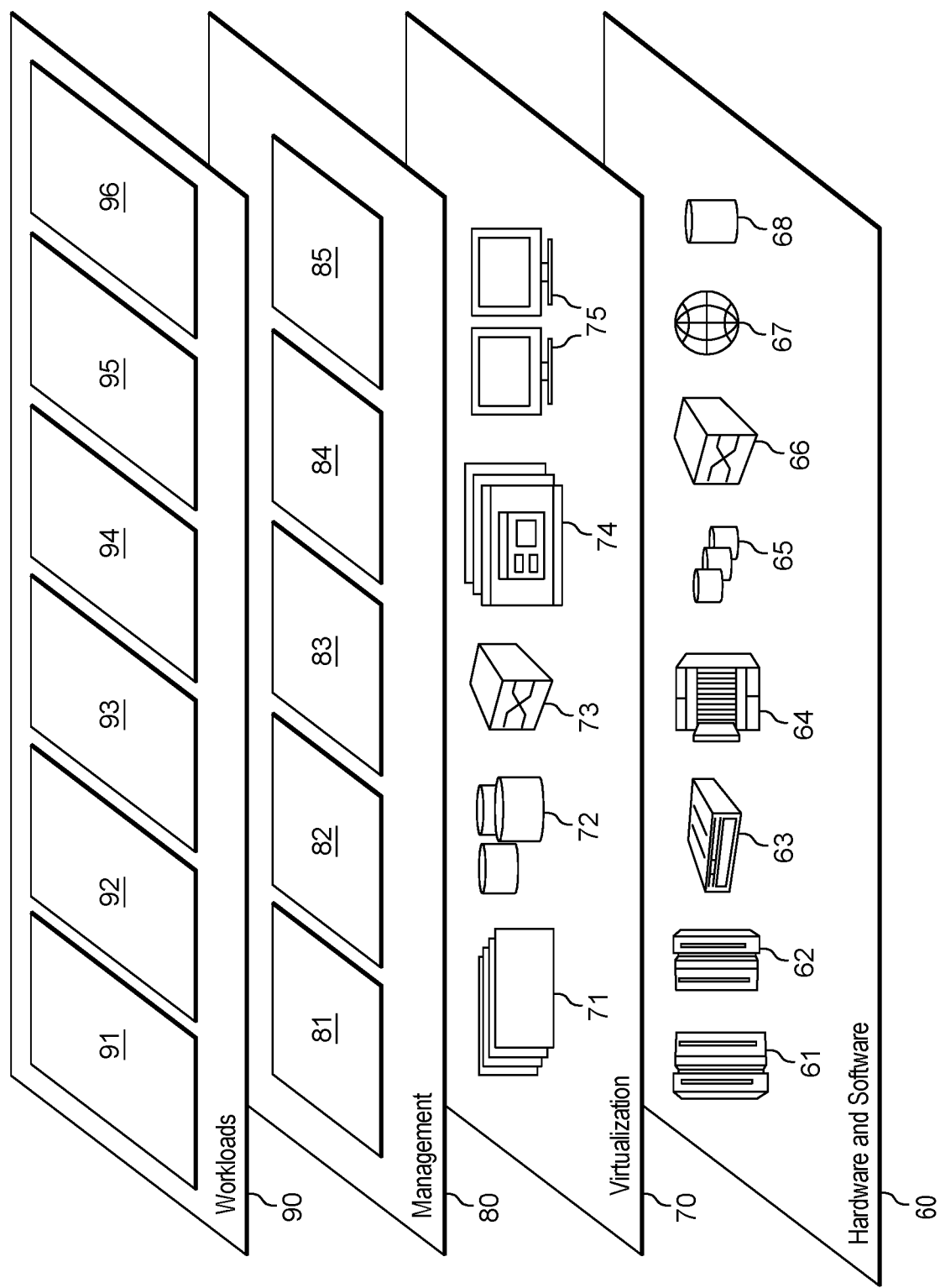
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software 96. In various embodiments of the present invention, software 96 is representative of storage policy module 200, storage synch program 300, and cloud policy engine 125, or corresponding processing capabilities, described in further detail respectively with regard to FIG. 1, FIG. 2 and FIG. 3.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for recall of an object migrated to cloud storage, the method comprising:
receiving, by one or more processors, a request to migrate an object from an on-premises storage location to a cloud storage environment;
determining, by the one or more processors, whether the object includes, in metadata associated with the object, a tag indicating storage rules based on an on-premises storage policy;
responsive to determining that the rules of the on-premises storage policy of the object do not match the storage policy rules of the cloud storage environment by comparison of policy rules, creating, by the one or more processors, a custom cloud storage policy that includes storage rules consistent with the rules of the on-premises storage policy associated with the object, and wherein the storage rules are included as an attribute of the metadata associated with the object;
adding, by the one or more processors, the custom cloud storage policy and a storage location of the object in the cloud storage environment to the metadata associated with the object;
migrating, by the one or more processors, the object to the cloud storage environment, wherein the object is stored based on the storage rules of the custom cloud storage policy included in the metadata associated with the object; and
receiving, by the one or more processors, a recall request for the object stored in the cloud storage environment;
determining, by the one or more processors, the storage location of the object within the cloud storage environment by accessing the metadata including a storage location associated with the object;
responsive to determining the object is stored in a low-activity storage location of the cloud storage environment, sending, by the one or more processors, a response to the recall request indicating a delay in a recall of the object from the low-activity storage location; and
responsive to determining a completion of transfer of the object from the low-activity cloud storage location to a default storage location of the cloud storage environment, sending, by the one or more processors, a notification indicating the object is available for recall to the on-premises storage application.

2. The method of claim 1, further comprising:
responsive to determining an absence of the tag included in the metadata of the object indicating the on-premises storage policy associated with the object, creating, by the one or more processors, a tag in the metadata associated with the object indicating an absence of the on-premises storage policy.

3. The method of claim 1, wherein the tag included in the metadata of the object indicates an on-premises storage policy corresponding to the storage object and the tag is labeled as a foreign storage policy for the cloud environment based on a comparison of the rules of on-premises the storage policy and the rules of the storage policies of the cloud environment.

4. The method of claim 1, wherein the storage policies of the cloud storage environment are automatically synchronized with the on-premises storage policy by creating the customized cloud storage policy and adding the customized cloud storage policy to a portfolio of storage policies of the cloud storage environment.

5. The method of claim 1, further comprising:
applying, by the one or more processors, a default cloud storage policy to the object migrating to the cloud storage environment in response to the object to migrate to a cloud storage environment does not include a pre-set on-premises storage policy tag.

6. The method of claim 1, wherein the metadata associated with the object is included with the migration of the object to the cloud storage environment.

7. The method of claim 1, wherein the attributes of the metadata of the object include rules of a duration of the custom cloud storage policy associated with the object.

8. The method of claim 1, wherein a background recall of the object initiates moving storage of the object from the low-activity storage location to a default storage location.

9. A computer program product for recall of an object migrated to cloud storage, the method comprising:
    at least one computer-readable storage medium; and
    program instructions stored on the at least one computer-readable storage medium, the program instructions comprising
        program instructions to receive a request to migrate an object from an on-premises storage location to a cloud storage environment;
        program instructions to determine whether the object includes, in metadata associated with the object, a tag indicating storage rules based on an on-premises storage policy;
        responsive to determining that the rules of the on-premises storage policy of the object do not match the storage policy rules of the cloud storage environment by comparison of policy rules, program instructions to create a custom cloud storage policy that includes storage rules consistent with the rules of the on-premises storage policy associated with the object, and wherein the storage rules are included as an attribute of the metadata associated with the object;
        program instructions to add the custom cloud storage policy and a storage location of the object in the cloud storage environment to the metadata associated with the object;
        program instructions to migrate the object to the cloud storage environment, wherein the object is stored based on the storage rules of the custom cloud storage policy included in the metadata associated with the object; and
        program instructions to receive a recall request for the object stored in the cloud storage environment;
        program instructions to determine the storage location of the object within the cloud storage environment by accessing the metadata including a storage location associated with the object;
        responsive to determining the object is stored in a low-activity storage location of the cloud storage environment, program instructions to send a response to the recall request indicating a delay in a recall of the object from the low-activity storage location; and
        responsive to determining a completion of transfer of the object from the low-activity cloud storage location to a default storage location of the cloud storage environment, program instructions to send a notification indicating the object is available for recall to the on-premises storage application.

10. The computer program product of claim 9, further comprising:
    responsive to determining an absence of the tag included in the metadata of the object indicating the on-premises storage policy associated with the object, program instructions to create a tag in the metadata associated with the object indicating an absence of the on-premises storage policy.

11. The computer program product of claim 9, wherein the tag included in the metadata of the object indicates an on-premises storage policy corresponding to the storage object and the tag is labeled as a foreign storage policy for the cloud environment based on a comparison of the rules of on-premises the storage policy and the rules of the storage policies of the cloud environment.

12. The computer program product of claim 9, further comprising:
    program instructions to automatically synchronize the storage policies of the cloud storage environment with the on-premises storage policy by adding the customized cloud storage policy that includes the rules of the on-premises storage policy to a portfolio of storage policies of the cloud storage environment.

13. The computer program product of claim 9, wherein the attributes of the metadata of the object include rules of a duration of the custom cloud storage policy associated with the object.

14. The computer program product of claim 9, wherein program instructions for a background recall of the object initiate moving storage of the object from the low-activity storage location to a default storage location.

15. A computer system for recall of an object migrated to cloud storage, the method comprising:
    one or more computer processors;
    at least one computer-readable storage medium; and
    program instructions stored on the at least one computer-readable storage medium, the program instructions comprising:
        program instructions to receive a request to migrate an object from an on-premises storage location to a cloud storage environment;
        program instructions to determine whether the object includes, in metadata associated with the object, a tag indicating storage rules based on an on-premises storage policy;
        responsive to determining that the rules of the on-premises storage policy of the object do not match the storage policy rules of the cloud storage environment by comparison of policy rules, program instructions to create a custom cloud storage policy that includes storage rules consistent with the rules of the on-premises storage policy associated with the object, and wherein the storage rules are included as an attribute of the metadata associated with the object;
        program instructions to add the custom cloud storage policy and a storage location of the object in the cloud storage environment to the metadata associated with the object;
        program instructions to migrate the object to the cloud storage environment, wherein the object is stored based on the storage rules of the custom cloud storage policy included in the metadata associated with the object; and
        program instructions to receive a recall request for the object stored in the cloud storage environment;
        program instructions to determine the storage location of the object within the cloud storage environment by accessing the metadata including a storage location associated with the object;
        responsive to determining the object is stored in a low-activity storage location of the cloud storage environment, program instructions to send a response to the recall request indicating a delay in a recall of the object from the low-activity storage location; and responsive to determining a completion of transfer of the object from the low-activity cloud storage location to a default storage location of the cloud storage environment, program instructions to send a notification indicating the object is available for recall to the on-premises storage application.

16. The computer system of claim 15, further comprising: responsive to determining an absence of the tag included in the metadata of the object indicating the on-premises storage policy associated with the object, creating, by the one or more processors, a tag in the metadata associated with the object indicating an absence of the on-premises storage policy.

17. The computer system of claim 15, wherein the tag included in the metadata of the object indicates an on-premises storage policy corresponding to the storage object and the tag is labeled as a foreign storage policy for the cloud environment based on a comparison of the rules of on-premises the storage policy and the rules of the storage policies of the cloud environment.

18. The computer system of claim 15, wherein the storage policies of the cloud storage environment are automatically synchronized with the on-premises storage policy by creating the customized cloud storage policy and adding the customized cloud storage policy to a portfolio of storage policies of the cloud storage environment.

19. The computer system of claim 15, wherein the attributes of the metadata of the object include rules of a duration of the custom cloud storage policy associated with the object.

20. The computer system of claim 15, wherein program instructions for a background recall of the object initiate moving storage of the object from the low-activity storage location to a default storage location.

* * * * *